Jan. 8, 1963 A. C. DI LAURENZIO 3,072,131
MOBILE CAR WASHING APPARATUS
Filed Nov. 3, 1961 3 Sheets-Sheet 1
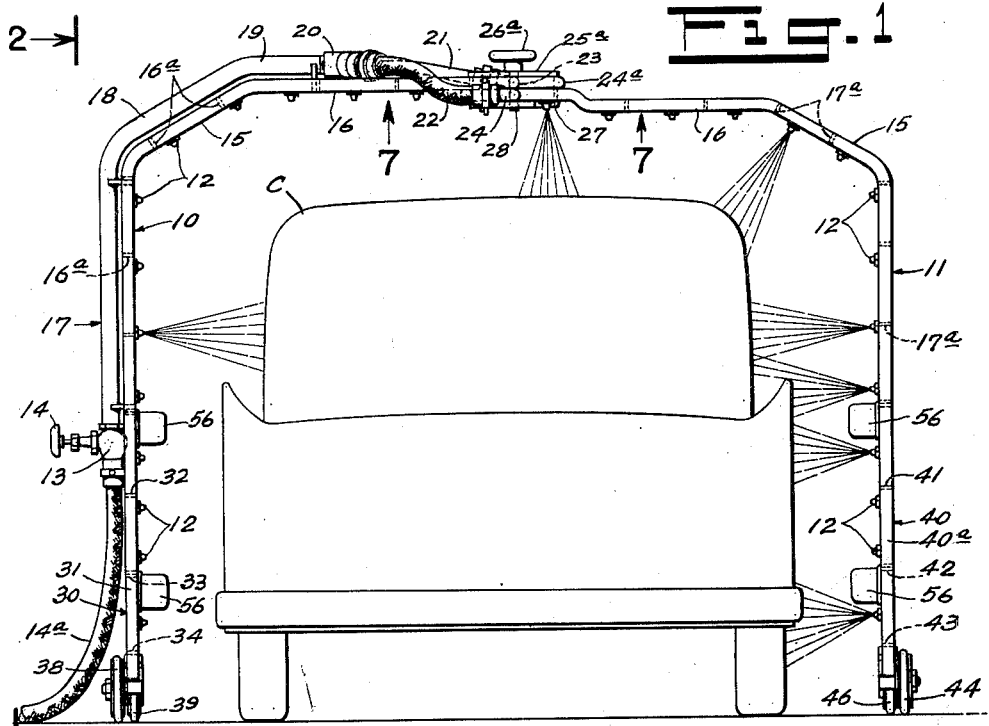
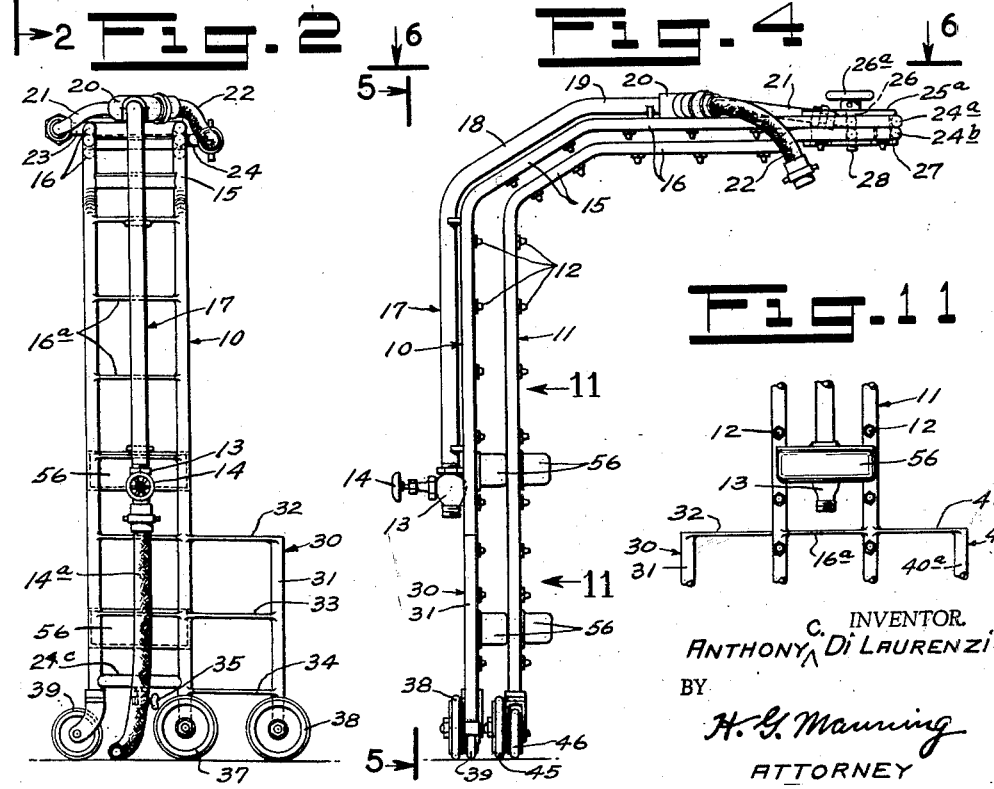
INVENTOR.
ANTHONY C. DI LAURENZIO
BY
H. G. Manning
ATTORNEY

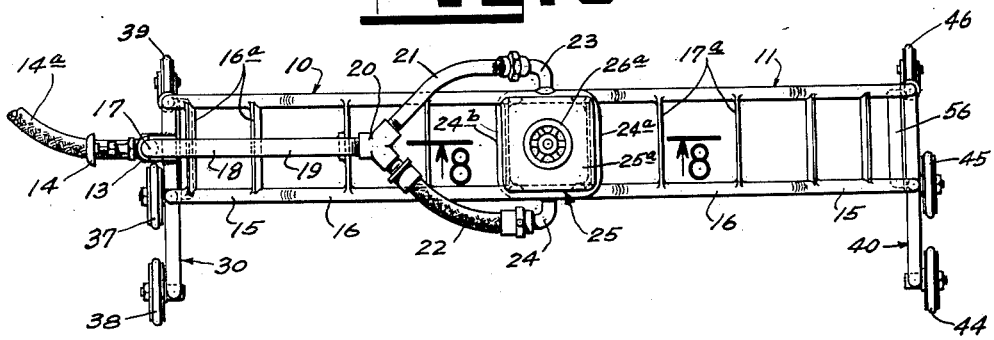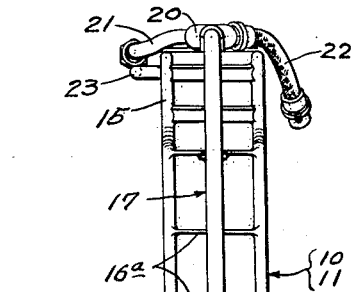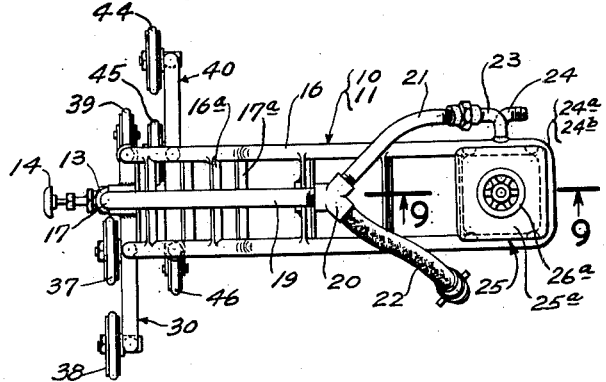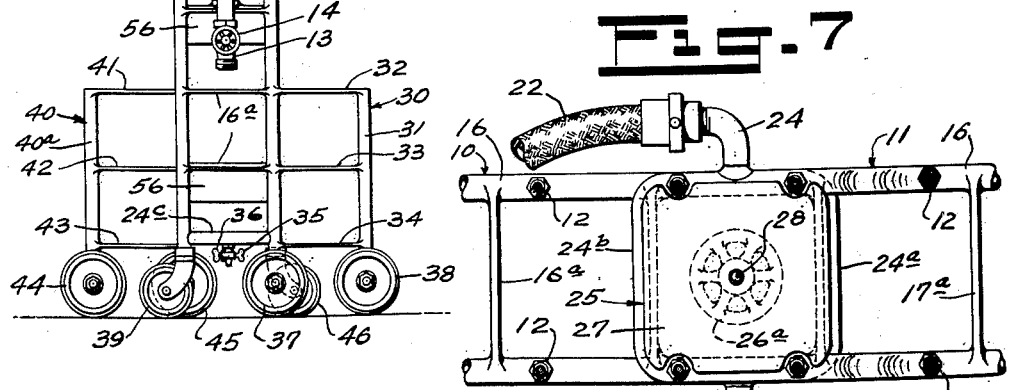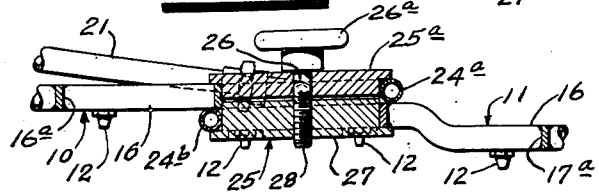

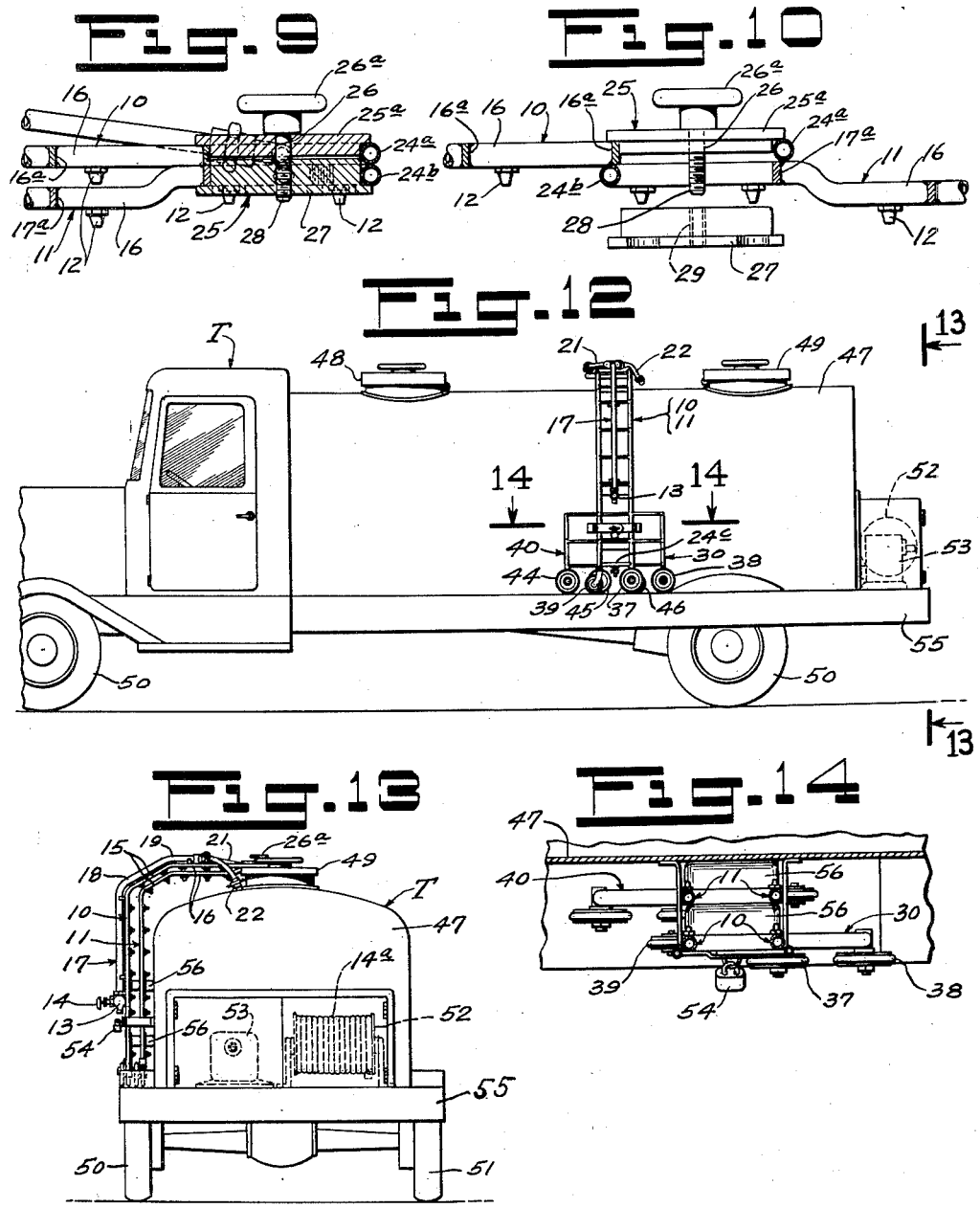

United States Patent Office 3,072,131
Patented Jan. 8, 1963

3,072,131
MOBILE CAR WASHING APPARATUS
Anthony C. Di Laurenzio, Webb Road,
Naugatuck, Conn.
Filed Nov. 3, 1961, Ser. No. 150,858
10 Claims. (Cl. 134—123)

This invention relates to car washing apparatus and more particularly to a car washer which may be moved from place to place for washing automotive vehicles in parking lots of factories, supermarkets, etc.

One object of the present invention is to provide a mobile car washing apparatus of the above nature, which will be inexpensive to construct, easy to install and manipulate, compact, ornamental in appearance, and very efficient and durable in use.

With these and other objects in view there has been illustrated on the accompanying drawings one form in which the invention may conveniently be embodied in practice.

In the drawings,

FIG. 1 represents an end view of the improved mobile car washing apparatus, showing an automobile in operating position ready to be washed by the pair of cooperating angular tubular spray banks embracing the top and sides of said automobile.

FIG. 2 is a side view of the left hand spray bank, showing the hand valve for controlling the supply of water to the car washing unit.

FIG. 3 is a top view of the pair of angular spray banks as they appear in assembled operating position.

FIG. 4 is an end view of the two spray banks as they appear in collapsed nested condition, when out of use.

FIG. 5 is a side view of the same.

FIG. 6 is a top view of the same, showing the Y-shaped junction pipe for connecting the water supply pipe to the two side spray banks.

FIG. 7 is a fragmentary bottom view, on a larger scale, of the connected left hand and right hand spray banks, taken along the line 7—7 of FIG. 1, looking upwardly.

FIG. 8 is a fragmentary enlarged cross-sectional view, taken along the line 8—8 of FIG. 3, showing the two-part top member for clamping together the two spray bank units.

FIG. 9 is a fragmentary enlarged cross-sectional view, taken along the line 9—9 of FIG. 6.

FIG. 10 is an exploded side view of the two parts of the clamping member shown in separated relation and illustrating how the spray banks can be brought into the position shown in FIGS. 3, 7, 8.

FIG. 11 is a fragmentary inside view of the collapsed spray bank units, taken along the line 11—11 of FIG. 4, showing one of the interior bumpers for preventing injury to the car being washed.

FIG. 12 is a side view of the water supply tank truck, showing the pair of spray banks in collapsed nested condition, embracing the tank, in position to be carried on the truck from one location to another.

FIG. 13 is a rear view of the same.

FIG. 14 is a fragmentary enlarged sectional view, taken along the line 14—14 of FIG. 12, looking downwardly.

Referring now to the drawings, in which like reference numerals denote corresponding parts throughout the several views, the numerals 10 and 11 indicate respectively a left hand angular hollow spray bank, and a right hand angular hollow spray bank, which spray banks 10 and 11 are adapted to embrace the top and opposite sides of a car C to be washed. The spray banks 10 and 11 have inclined sections 15 and horizontal top sections 16 which are provided with interior spray nozzles 12.

Each of the banks 10 and 11 includes a pair of vertical side pipes joined by cross members 16a and 17a respectively.

Provision is also made of a valve 13 having a circular control handle 14 for turning on and off the water from a hose 14a connected through a pump 53 to a supply tank 47, mounted on a motor truck T. If desired, however, any other suitable source of water supply may be used instead of the tank 47.

The valve 13 is connected to an upstanding angular pipe 17 having an inclined section 18 and horizontal top section 19 leading to a Y-junction 20 which is connected by a pipe 21 and a hose 22 to a pair of metal angle pipes 23 and 24 connected to the top sections 16 of the angular spray banks 10 and 11. The inner ends of the upper top sections 16 of the spray banks 10 and 11 have cross pipes 24a, 24b, and the lower ends of said spray banks have cross pipes 24c.

The spray banks 10 and 11 are adapted to be detachably held rigidly together by a two-part top clamp member 25 (FIGS. 9, 10), having upper and lower sections 25a, 27, which sections are secured tightly to said spray banks 10 and 11 respectively by a screw 26 mounted on said upper clamp section 25a, said screw having a circular top handle 26a, and being provided with a threaded lower portion 28, which is adapted to engage in a screw hole 29 (FIG. 10) formed in the lower section 27 of the clamp 25.

The left hand angular spray bank 10 is provided with a bottom laterally extending ladder section 30, having at one side a vertical tube 31 connected by three small horizontal cross members 32, 33, 34 to the vertical spray bank 10, as clearly shown in FIG. 2 of the drawing.

Provision is also made at the center of the cross pipes 24c connecting the bottom legs of the hollow spray banks 10 and 11, of a pair of drain cocks 35, 36.

The bottom of the left hand angular spray bank 10 is provided with a pair of stationary wheels 37, 38, and a swivel wheel 39 (see FIGS. 2 and 3). The right hand angular spray bank 11 is also provided with a lateral ladder extension 40 having a single vertical tube 40a (FIG. 5) connected by three small horizontal cross members 41, 42, 43 to one of the vertical side pipes of the right hand bank 11, said bank being supported by a pair of stationary wheels 44, 45 and a single swivel wheel 46.

In order to support the portable horizontal water tank 47, the motor truck T is mounted upon a frame 55 which is carried by rubber tired wheels 50, 51 (FIG. 12). The water tank 47 has a pair of removable top covers 48, 49, and provision is also made of a hose reel 52 connected with the pump 53 for conveying water under pressure to the spray banks 10, 11. Provision is also made of a lock 54 to prevent unauthorized operation of the apparatus when it is out of use.

In order to prevent injury to the automobile being washed, provision is made of a plurality of interior rectangular rubber bumpers 56 secured in any desired manner between the vertical sections of the left and right hand ladder banks 10, 11, as clearly shown in the drawing.

Operation

In the use of the improved mobile car washing apparatus herein disclosed, the automobile C to be washed will be driven as close as convenient to the supply of water, such as the tank 47. The angular spray banks, or "quadrants" 10 and 11, will then be removed from their collapsed nested position on the tank 47, as shown in FIGS. 12 and 13, and assembled in the operating positions shown in FIG. 1, embracing the top and sides of the car. The hose 14a will then be connected to the source of water supply, and water will be conveyed through the pipe 17 and Y-connection 20 to the assembled spray banks 10 and 11.

The top and both sides of the car C will first be sprayed with water, after which the spray banks 10 and 11 will be rolled off the end of the car. The car will then be washed by hand with soap and water or detergent liquid, using the ladder to reach the top portions of the car. The quadrant banks 10 and 11 will then be rolled back over the car so that it may be thoroughly rinsed with water, after which the car will be wiped dry.

It will be understood that during the operation of the improved car washer, the spray banks 10 and 11 may be rolled slowly back and forth on their wheels from one end to the other of the car, embracing the latter, while it is being washed and rinsed.

While there has been disclosed in this specification one form in which the invention may be embodied, it is to be understood that this form is shown for the purpose of illustration only, and that the invention is not limited to the specific disclosure, but may be modified and embodied in various other equivalent forms without departing from its spirit. In short, the invention includes all the modifications and embodiments coming within the scope of the following claims.

Having thus fully described the invention, what is claimed as new and for which it is desired to secure Letters Patent is:

1. In a mobile car washer, a pair of hollow angular spray banks having upper overlapping horizontal sections, a two part clamp for detachably connecting said upper horizontal sections, each of said spray banks having a vertical section, means to connect one of said vertical sections to a water supply hose, each of said spray banks comprising a plurality of parallel pipes connected by a plurality of horizontal cross members, the bottoms of each of said spray banks having wheels adapted to rest on the ground to permit said spray banks to be moved as a unit back and forth over the car to be washed, and a plurality of spray nozzles located on the under side of the said upper horizontal sections and on the inside of said vertical sections, respectively.

2. The invention as defined in claim 1, in which the horizontal top section and the vertical side section of each spray bank are connected by integral inclined pipe sections having interior spray nozzles mounted therein.

3. The invention as defined in claim 1, in which both of said angular spray banks comprise a pair of vertical pipes and a pair of horizontal pipes, and a Y-shaped junction between the inner ends of said upper horizontal pipes to connect the two banks together in a U-shaped arrangement so that water will be supplied simultaneously to both of said spray banks.

4. The invention as defined in claim 1, in which one of said angular spray banks is reversible, so that it may be nested in parallel relation with respect to the spray bank for embracing a water tank on an automotive truck when it is desired to transport said car washer to a different location.

5. The invention as defined in claim 1, in which said two part clamp members are square in shape and interfit with each other, said clamp members being secured together detachably by a headed screw passing through the center of both of said clamp members.

6. The invention as defined in claim 1, in which the vertical sections of said spray banks are provided on their inner sides with rubber bumpers to prevent injury to the car being washed.

7. The invention as defined in claim 1, in which the lower sections of said vertical spray bank sections are provided with laterally extending ladders to permit the operator to reach the upper part of said car during the washing thereof.

8. The invention as defined in claim 1, in which the axis of one of said wheels is stationary, and another of said wheels is mounted to swivel with respect to said spray bank.

9. The invention as defined in claim 1, in which the vertical pipes of said spray banks are connected together at the bottom by cross pipes.

10. The invention as defined in claim 9, in which said cross pipes are provided with drain cocks to permit the spray banks to be emptied whenever desired.

References Cited in the file of this patent
UNITED STATES PATENTS

| | | |
|---|---|---|
| 543,008 | Gale | July 23, 1895 |
| 2,465,562 | Hopper | Mar. 29, 1949 |